United States Patent
Sung

(10) Patent No.: US 7,443,640 B2
(45) Date of Patent: Oct. 28, 2008

(54) APPARATUS FOR DETECTING ARC FAULT

(76) Inventor: Sam Kyoung Sung, #1303., 115-dong, LG jaei 1st Apt. Sinbong-dong, Yongin-si, Gyeonggido, 449-533 (KR)

( * ) Notice: Subject to any disclaimer, the term of this patent is extended or adjusted under 35 U.S.C. 154(b) by 124 days.

(21) Appl. No.: 11/288,454

(22) Filed: Nov. 25, 2005

(65) Prior Publication Data

US 2007/0121261 A1     May 31, 2007

(51) Int. Cl.
    *H02H 7/26*     (2006.01)
    *G01R 31/08*     (2006.01)

(52) U.S. Cl. .................... 361/7; 361/5; 361/6; 324/536

(58) Field of Classification Search .............. 361/5, 361/6, 7; 324/536
See application file for complete search history.

(56) References Cited

U.S. PATENT DOCUMENTS

| | | | | |
|---|---|---|---|---|
| 4,204,156 A | * | 5/1980 | Sawada et al. ............... | 324/772 |
| 4,342,960 A | * | 8/1982 | Sawada ....................... | 324/772 |
| 4,451,786 A | * | 5/1984 | Sawada et al. ............... | 324/772 |
| 5,729,145 A | * | 3/1998 | Blades ........................ | 324/536 |
| 5,815,352 A | * | 9/1998 | Mackenzie .................... | 361/42 |
| 6,362,628 B2 | * | 3/2002 | Macbeth et al. .............. | 324/536 |
| 2004/0095695 A1 | | 5/2004 | Kim et al. | |

* cited by examiner

*Primary Examiner*—Michael J Sherry
*Assistant Examiner*—Zeev Kitov
(74) *Attorney, Agent, or Firm*—Jordan and Hamburg LLP

(57) ABSTRACT

Disclosed herein is an apparatus for detecting an arc fault, which prevents a malfunction caused by a conventional current detecting method by detecting a source voltage applied onto a conductive wire to determine whether there is an arc fault, prevents a malfunction with respect to a pseudo arc signal by dividing a current detecting route into two according to the magnitude of a load current occurring onto the conductive wire to determine whether there is the arc fault by voltage detection, and lessens the danger of a fire by reducing a circuit break time according to the magnitude of the load current. A voltage detector detects the arc fault by use of two detecting routes. Each route differs in a filtering value of a filter, presence/absence of level limit, an amplification factor of an amplifier, an accumulation value of a comparator, etc. according to the magnitude of a load current occurring on a conductive wire, thereby reducing a circuit break time.

3 Claims, 3 Drawing Sheets

APPARATUS FOR DETECTING ARC FAULT

BACKGROUND OF THE INVENTION

1. Field of the Invention

The present invention relates to an apparatus for detecting an arc fault, and more particularly, to an apparatus for detecting an arc fault, which first prevents a malfunction caused by a conventional current detecting method by detecting a source voltage applied onto a conductive wire to determine whether there is an arc fault, prevents a malfunction with respect to a pseudo arc signal by dividing a current detecting route into two according to the magnitude of a load current occurring onto the conductive wire to determine whether there is the arc fault by voltage detection, and lessens the danger of a fire by reducing a circuit break time according to the magnitude of the load current.

2. Background of the Invention

Arc faults, such as a series arc fault, a parallel arc fault and a ground arc fault, are generated via an electric wiring due to physical, electric faults caused by an aged wiring, breakdown of a wiring, insulation failures, overcurrents, etc. Since the arc faults are the cause of a fire, it is mandatory in the U.S. to use an arc fault circuit interrupter (AFCI) for breaking a circuit of electric equipment upon an occurrence of an arc fault.

In detecting an arc fault, it is necessary to discriminate between an arc signal, and a pseudo arc signal, that is, a signal generated when electric equipment is activated or when a dimmer is operated.

A conventional arc fault detector, in some cases, breaks a circuit by regarding an electric equipment starting signal or a dimmer signal as an arc fault signal.

An improved arc fault detecting apparatus for preventing such a malfunction is disclosed in Korean patent application No. 10-2002-71166.

FIG. 1 illustrates the apparatus for detecting an arc fault, disclosed in the above patent application.

Referring to FIG. 1, the apparatus for detecting an arc fault comprises a current detector 500 for detecting the amount of change in current flowing onto a conductive wire between a power source 520 and a load 522 and generating a signal proportional to the amount of change, a signal transformer 502 for passing a signal having a high frequency component out of the signal output from the current detector 500 and limiting a level of the signal so as not to exceed a predetermined signal level, a first level limit amplifier 504 for limitedly amplifying the signal output from the signal transformer 502, a high pass filter 526 for passing a signal having a high frequency component out of the signal output from first level limit amplifier 504, a second level limit amplifier 506 for amplifying the signal output from the high pass filter 526, a second arc determination unit 524 for determining whether an arc is detected by integrating the output signal of the second level limit amplifier 506 for a predetermined time, a signal level detector 508 for determining whether the input signal exceeds a predetermined first reference voltage and generating a detection signal, a pulse generator 510 for transforming the detection signal output from the signal level detector 508 into a pulse signal having a normalized form, a first arc determination unit 512 for counting the pulse signal output from the pulse generator 510 for a predetermined time, determining whether an arc occurs, and generating an arc detection signal, and a circuit breaker 514 breaking the conductive wire when the arc detection signal is generated.

In operation, the current detector 500 detects the amount of change of current flowing onto the conductive wire between the power source 520 and the load 522 and generates a signal proportional to the amount of change.

The signal transformer 502 receiving the output signal of the current detector 500 passes a signal having a high frequency component and limits a level of the signal so as not to exceed a predetermined signal level. The output signal of the signal transformer 502 is input to the first level limit amplifier 504. Accordingly, the signal transformer 502 serves as a determiner for detecting a high frequency signal, i.e., an arc signal.

The first level limit amplifier 504 amplifies the signals output from the signal transformer 502 by limiting the amplification level in order to detect the arc signal having a lower amplitude than an amplitude of a main signal.

A noise component of the output signal of the first level limit amplifier 504 is eliminated through the high pass filter 526 passing only the signal having a high frequency component, and the output signal of the high pass filter 526 is input to the second level limit amplifier 506.

The second level limit amplifier 506 amplifies the signal output from the high pass filter 526, and the amplified signal is input to the second arc determination unit 524.

The second arc determination unit 524 determines whether an arc is detected by integrating the output signal of the second level limit amplifier 506 for a predetermined time in order to judge an arc which is instantaneously generated like a parallel arc.

The signal level detector 508 determines whether the input signal exceeds a predetermined first reference voltage and generates a detection signal.

The detection signal output from the signal level detector 508 is applied to the pulse generator 510. The pulse generator 510 transforms the detection signal output from the signal level detector 508 into a pulse signal having a normalized form.

The first arc determination unit 512 counts the pulse signal output from the pulse generator 510 for a predetermined time, determines whether an arc occurs, and generates an arc detection signal. That is, the first arc determination unit 512 determines whether the pulse signal output from the pulse generator 510 is an arc signal, a dimmer signal, or an activation signal by counting the number of pulses. If the pulse signal is judged to be an arc signal, the first arc determination unit 512 outputs a break signal to the circuit breaker 514 so as to break the circuit.

The above-described apparatus determines whether an arc fault occurs or not by detecting current flowing onto the conductive wire between the source and the load.

In order to detect the current, a current sensor called a current transformer (CT) using a ring core is employed. The detecting range or characteristic of current flowing onto the conductive wire differs according to the material or operational properties of the current transformer.

The output signal of the current transformer is determined in proportion to the number of windings of a coil wound around a core with respect to an input signal. However, in order to obtain the accurate output according to the magnitude of the input current, the huge number of windings of the coil is needed and as a result the size of the current transformer and core is increased.

For example, in detecting current flowing onto a phase (hot) conductive wire by using the current transformer, if the current of 10 amperes flows onto the conductive wire, the output signal of 5 voltages is detected, and if the current of 5 amperes flows, the output signal of 10 voltages is detected.

Although this current detecting method can easily detect the arc signal, a signal similar to the arc signal is also detected and thus there is a strong probability of a malfunction.

Furthermore, since the conventional arc fault detecting apparatus detects the arc signal by a single route without discriminating between a low current and a high current, many problems occur in setting a frequency band, or a circuit break time from an occurrence of the arc signal to the break of the circuit.

SUMMARY OF THE INVENTION

Therefore, the present invention has been made in view of the above problems occurring in the prior art, and it is an object of the present invention to provide an apparatus for detecting an arc fault, which prevents a malfunction generated by conventional current detection by detecting a source voltage applied onto a conductive wire to determine whether there is an arc fault.

Another object of the present invention is to provide an apparatus for detecting an arc fault, which prevents a malfunction with respect to a pseudo arc signal by dividing a current detecting route into two according to the magnitude of a load current occurring onto a conductive wire, and lessens the danger of a fire by reducing a circuit break time according to the magnitude of a load current.

To accomplish the above objects, according to an embodiment of the present invention, there is provided an apparatus for detecting an arc fault occurring on a conductive wire between a power source and a load, comprising: a voltage detector disposed between a phase conductive wire and a neutral wire, for detecting the amount of change in voltage per unit time with respect to the power source; a first frequency band setting unit for setting a frequency band for a low load current with respect to the signal output from the voltage detector; a first filter for detecting a high frequency signal out of the signal output from the first frequency band setting unit; a first level limiter for limiting a level of a dimmer signal out of the signal output from the first filter so as to discriminate between the dimmer signal and an arc signal; a second filter for detecting a high frequency signal out of the level-limited signal output from the first level limiter to detect only a frequency band of the arc signal; a first frequency limit amplifier for limitedly amplifying the frequency band of the signal detected from the second filter; a first level comparative oscillator for generating an oscillating signal with a pulse width determined according to the magnitude of current preset in a low load detecting route when the signal output from the first frequency limit amplifier is higher than a predetermined reference voltage; a first comparator for accumulating signals oscillated from the first level comparative oscillator and a second level comparative oscillator and generates a signal when the accumulated signal is higher than a reference voltage; a circuit breaker for breaking an electric connection between the power source and the load in response to the signal output from the first comparator; a second frequency band setting unit for setting a frequency band for a high load current with respect to the signal output from the voltage detector; a third filter for detecting a high frequency signal out of the signal output from the second frequency band setting unit; a second frequency limit amplifier for limitedly amplifying a frequency band of the signal detected from the third filter; and the second level comparative oscillator for generating an oscillating signal with a pulse width determined according to the magnitude of current preset in a high load detecting route when the signal output from the second frequency limit amplifier is higher than a predetermined reference voltage.

According to another embodiment of the present invention, there is also provided an apparatus for detecting an arc fault occurring on a conductive wire between a power source and a load, comprising: a voltage detector disposed between a phase conductive wire and a neutral wire, for detecting the amount of change in voltage per unit time with respect to the power source; a first frequency band setting unit for setting a frequency band for a low load current with respect to the signal output from the voltage detector; a first filter for detecting a high frequency signal out of the signal output from the first frequency band setting unit; a first level limiter for limiting a level of a dimmer signal out of the signal output from the first filter so as to discriminate between the dimmer signal and an arc signal; a second filter for detecting a high frequency signal out of the level-limited signal output from the first level limiter to detect only a frequency band of the arc signal; a first frequency limit amplifier for limitedly amplifying the frequency band of the signal detected from the second filter; a first level comparative oscillator for generating an oscillating signal with a pulse width determined according to the magnitude of current preset in a low load detecting route when the signal output from the first frequency limit amplifier is higher than a predetermined reference voltage; a first comparator for accumulating signals oscillated from the first level comparative oscillator and a second level comparative oscillator and generates a signal when the accumulated signal is higher than a reference voltage; a circuit breaker for breaking an electric connection between the power source and the load in response to the signal output from the first comparator; a second frequency band setting unit for setting a frequency band for a high load current with respect to the signal output from the voltage detector; a third filter for detecting a high frequency signal out of the signal output from the second frequency band setting unit; a second frequency limit amplifier for limitedly amplifying a frequency band of the signal detected from the third filter; the second level comparative oscillator for generating an oscillating signal with a pulse width determined according to the magnitude of current preset in a high load detecting route when the signal output from the second frequency limit amplifier is higher than a predetermined reference voltage; a current detector for detecting the amount of change in current flowing onto the phase conductive wire or the neutral wire and generating a signal proportional to the amount of change; a second comparator for setting the signal detected from the current detector as its reference voltage, receiving a setting reference voltage of one branch point of a load current detecting route as its input, and stopping generating an output signal when the signal output from the current detector is higher than the setting reference voltage of the branch point of the current detecting route; and a first current branch switching unit for limiting an output oscillation by controlling the second level comparative oscillator when the second comparator generates the output signal, and limiting an output oscillation by controlling the first level comparator oscillator when the second comparator does not generate the output signal.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Reference will now be made in detail to the preferred embodiment of the present invention with reference to the attached drawings.

Figure 1:
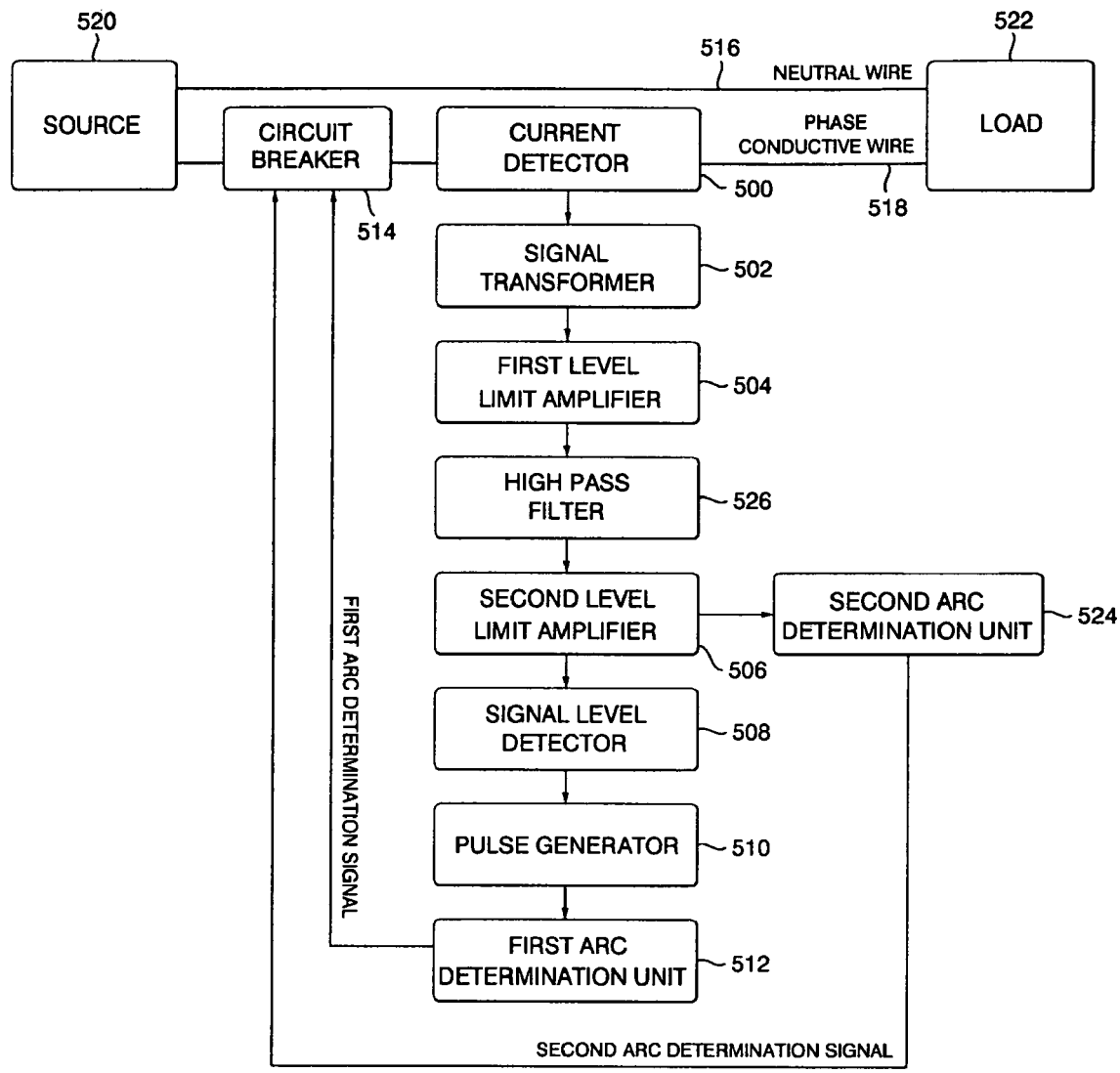
FIG. 1 is a block diagram of a conventional apparatus for detecting an arc fault.
Figure 2:
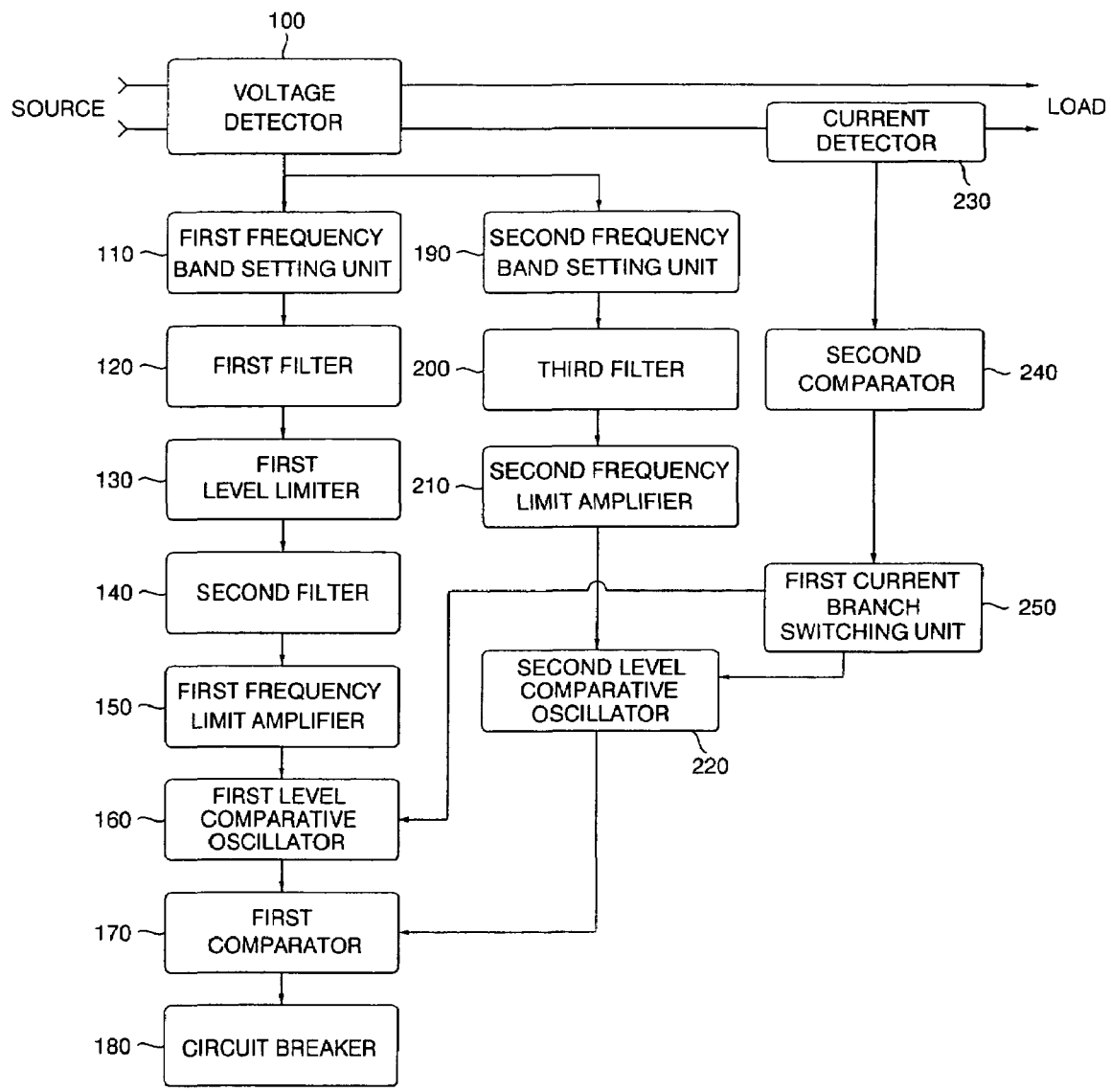
FIG. 2 is a block diagram of an apparatus for detecting an arc fault according to an exemplary embodiment of the present invention.
Figure 3:
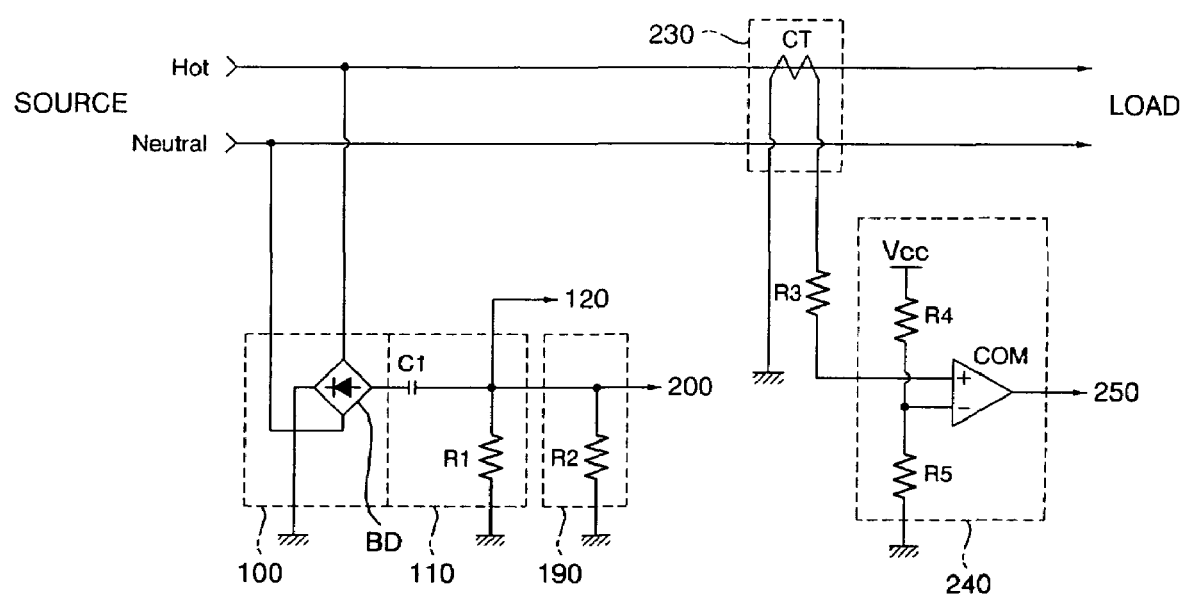
FIG. 3 is a detailed circuit diagram of the main parts of the apparatus of FIG. 2 according to an exemplary embodiment of the present invention.

FIG. 2 is a block diagram of an apparatus for detecting an arc fault according to an exemplary embodiment of the present invention, and FIG. 3 is a detailed circuit diagram of the main parts of the apparatus of FIG. 2 according to an exemplary embodiment of the present invention.

Referring to FIG. 2, the apparatus for detecting an arc fault includes a voltage detector 100, a first frequency band setting unit 110, a first filter 120, a first level limiter 130, a second filter 140, a first frequency limit amplifier 150, a first level comparative oscillator 160, a fist comparator 170, a circuit breaker 180, a second frequency band setting unit 190, a third filter 200, a second frequency limit amplifier 210, and a second level comparative oscillator 220.

The apparatus for detecting an arc fault further includes a current detector 230, a second comparator 240, and a first current branch switching unit 250.

The voltage detector 100 detects the amount of change in voltage per unit time with respect to a power source. As illustrated in FIG. 3, the voltage detector 100 full-wave rectifies a voltage between a phase (hot) conductive wire and a neutral wire by using a bridge diode BD and detects a voltage by the rectified signal.

The first frequency band setting unit 110 is for setting a frequency band for the signal output from the voltage detector 100. The first frequency band setting unit 110 sets a frequency band for a low load current, i.e., a frequency band of a low current detecting route. The first frequency band setting unit 100 is comprised of, as illustrated in FIG. 3, a capacitor C1 and a resistor R1, and sets a frequency band for a low load current by adjusting the value of the resistor R1.

The first filter 120 detects a high frequency signal out of the output signal of the first frequency band setting unit 110 and limits a signal except the high frequency signal. The first filter 120 also detects a frequency band of a dimmer signal overlapping an arc signal. This is because if the frequency band of the dimmer signal is limited, the frequency band of the arc signal is not detected either. Consequently, both the arc signal and the dimmer signal are simultaneously detected through the first filter 120.

The first level limiter 130 limits the level of the dimmer signal out of the output signal of the first filter 120 in order to discriminate between the dimmer signal and the arc signal.

The second filter 140 detects a high frequency signal out of the level-limited signal output from the first level limiter 130 to detect only the frequency band of the arc signal.

The first frequency limit amplifier 150 amplifies the level of the signal detected from the second filter 140. In order to minimize an influence on an element of the amplifier, the amplified frequency band is limited.

The first level comparative oscillator 160 generates an oscillating signal with a pulse width determined according to the magnitude of current preset in the low load detecting route when the signal output from the first frequency limit amplifier 150 is higher than a predetermined reference voltage. Since the magnitude of the pulse width of the first level comparative oscillator 160 increases as the magnitude of the load current increases, a signal accumulating time at an accumulator of the first comparator 170 becomes faster and thus a circuit break time is shortened. The circuit break time means time from an occurrence of an arc to the break of the circuit. The accumulator may be a capacitor.

The first comparator 170 accumulates signals oscillated from the first and second level comparative oscillators 160 and 220 and generates a signal when the accumulated signal is higher than a predetermined reference voltage.

The circuit breaker 180 breaks an electric connection between the power source and the load in response to the signal output from the first comparator 170.

The second frequency band setting unit 190 is for setting a frequency band of the signal output from the voltage detector 100. The second frequency band setting unit 190 sets a frequency band for a high load current, i.e., a frequency band of a high current detecting route. As illustrated in FIG. 3, the second frequency band setting unit 190 is comprised of a resistor R2 and sets the frequency band for the high load current by adjusting the value of the resistor R2.

The third filter 200 detects a high frequency signal out of the signal output from the second frequency band setting unit 190. Unlike the first filter 120, the third filter 200 does not have to be connected to an additional level limiter because the high current detecting route controls a load current exceeding the dimmer load.

The second frequency limit amplifier 210 amplifiers a level of the signal detected from the third filter 200. In order to minimize an influence on an element, the second frequency limit amplifier 210 limits the amplified frequency band. A capacitor is disposed between an output terminal and an inverting input terminal of the second frequency limit amplifier 210.

The second level comparative oscillator 220 generates an oscillating signal with a pulse width determined according to the magnitude of current preset in the high detecting route when the signal output from the second frequency limit amplifier 210 is higher than a predetermined reference voltage. Since the pulse width of the oscillating signal output from the second level comparative oscillator 220 increases as the magnitude of the load current increases, the signal accumulating time at the accumulator of the first comparator 170 becomes faster and thus the circuit break time is reduced. Since the magnitude of the load current increases in the high load current detecting route, the circuit break time should be fast, for example, it should be at least 80 milliseconds. That is, each route differs in the signal accumulating time at the accumulator. The circuit break time is configured to be slow for a low load and fast for a high load.

The current detector 230 detects the amount of change in current flowing onto the phase (hot) conductive wire or the neutral wire and generates a signal proportional to the amount of change. As illustrated in FIG. 3, the current detector 230 detects the current flowing onto the conductive wire by using a current transformer CT.

The second comparator 240 set the signal detected from the current detector 230 as its reference voltage and receives a setting voltage of one branch point of the load current detecting route as its input. That is, as shown in FIG. 3, the signal generated through the current transformer CT of the current detector 230 and through a saturation current setting resistor R3 is applied to a non-inverting terminal (+) of the comparator COM as the reference voltage, and a voltage of a branch point of the load current detecting route divided by resistors R4 and R5 is applied to an inverting terminal (−) of the comparator COM. Therefore, if the signal output from the current detector 230 is higher than the setting reference of the branch point of the current detecting route, the comparator COM does not generate any output signal.

The first current branch switching unit 250 limits an output oscillation by controlling the second level comparative oscillator 220 if the second comparator 240 generates the output signal, and limits an output oscillation by controlling the first level comparator oscillator 170 if the second comparator 240 does not generate the output signal.

Hence, the inventive apparatus prevents a malfunction that breaks a circuit with respect to a load signal similar to the arc signal by setting an operational characteristic of each detecting route according to the magnitude of the load current by operating only one detecting route by a switching operation of the first current branch switching unit 250 based on the branch point of the load current detecting route.

Thus the voltage detector 100 detects an arc fault by use of two detecting routes. Each route differs in a filtering value of the filter, presence/absence of level limit, an amplification factor of the amplifier, an accumulation value of the comparator, etc. according to the magnitude of the load current occurring on the conductive wire. This is for reducing the circuit break time because the frequency level of the arc signal differs according to the magnitude of the load current and the danger of a fire increases as the magnitude of the load current increases.

An operation of the apparatus for detecting an arc fault will now be described.

The voltage detector 100 full-wave rectifies a voltage between the phase (hot) conductive wire and the neutral wire by using the bridge diode BD and detects a voltage by the rectified signal.

The voltage output from the voltage detector 100 is set to a frequency band for a low load current through the capacitor C1 and resistor R1 of the first frequency band setting unit 110 and then input to the first filter 120. At the same time, the voltage output from the voltage detector 100 is set to a frequency band for a high load current through the resistor R2 of the second frequency band setting unit 190 and then input to the third filter 200.

The first filter 120 detects a high frequency signal out of the output signal of the first frequency band setting unit 110. Therefore, not only the arc signal but also the dimmer signal similar to the arc signal is detected.

The first level limiter 130 limits a level of the dimmer signal out of the output signal of the first filter 120 in order to discriminate between the dimmer signal and the arc signal.

The second filter 140 detects a high frequency signal out of the level-limited signal output from the first level limiter 130. Since the second filter 140 detects only the frequency band of the arc signal, only the arc signal is detected when the arc signal exists.

The signal output from the second filter 140 is applied to the first frequency limit amplifier 150, and the first frequency limit amplifier 150 amplifies the level of the signal detected from the second filter 140.

The first level comparative oscillator 160 generates an oscillating signal with a pulse width determined according to the magnitude of current preset to the detecting route when the signal output from the first frequency limit amplifier 150 is higher than a predetermined reference voltage. Since the magnitude of the pulse width of the first level comparative oscillator 160 increases as the magnitude of the load current increases, an accumulating time at accumulator of the first comparator 170 becomes faster and thus a circuit break time is reduced.

The first comparator 170 accumulates signals oscillated from the first and second level comparative oscillators 160 and 220 and generates a signal when the accumulated signal is higher than a reference voltage.

The circuit breaker 180 breaks an electric connection between the power source and the load in response to the signal output from the first comparator 170.

Meanwhile, the signal output from the second frequency band setting unit 190 is input to the third filter 200 where only a high frequency signal is detected. The third filter 200 does not have to be connected to an additional level limiter because the high current detecting route controls a load current exceeding the dimmer load.

The signal output from the third filter 200 is amplified by the second frequency limit amplifier 210 and then input to the second level comparative oscillator 220. The second level comparative oscillator 220 generates an oscillating signal with a pulse width determined according to the magnitude of current preset in the high detecting route when the signal output from the second frequency limit amplifier 210 is higher than a predetermined reference voltage.

Since the pulse width of the oscillating signal output from the second level comparative oscillator 220 increases as the magnitude of the load current increases, the signal accumulating time at the accumulator of the first comparator 170 becomes faster and thus the circuit break time is shortened. Since the magnitude of the load current increases in the high load current detecting route, the circuit break time should be fast.

The oscillating signal output from the second level comparative oscillator 220 is input to the first comparator 170 where a signal is generated when the accumulation voltage of the input signal is higher than a predetermined reference voltage.

The signal output from the first comparator 170 is input to the circuit breaker 180 breaking the circuit.

The current detector 230 detects the amount of change in current flowing onto the phase conductive wire or the neutral wire. The signal detected through the current transformer CT is input to the second comparator 240.

The second comparator 240 receives the signal detected from the current detector 230 through a non-inverting (+) terminal of the comparator COM as a reference voltage and receives a setting voltage of one branch point of the load current detecting route divided by the resistors R4 and R5 through an inverting (−) terminal of the comparator COM. That is, if the signal output from the current detector 230 is higher than the setting voltage of the branch point of the current route branch, the second comparator 240 does not generate any output signal, and if not, the second comparator 240 generates the output signal.

The first current branch switching unit 250 limits an output oscillation by controlling the second level comparative oscillator 220 if the second comparator 240 generates the output signal, and limits an output oscillation by controlling the first level comparator oscillator 170 if the second comparator 240 does not generate the output signal.

Hence, the inventive apparatus prevents a malfunction that breaks a circuit with respect to a load signal similar to the arc signal by setting an operational characteristic of each detecting route according to the magnitude of the load current by operating only one detecting route by a switching operation of the first current branch switching unit 250 based on the branch point of the load current detecting route.

As can be appreciated from the foregoing description, the inventive apparatus prevents a malfunction generated by the prior art current detection by detecting the source voltage applied onto the conductive wire to determine whether there is an arc fault. Moreover, a malfunction with respect to a pseudo arc signal is prevented by dividing the current detecting route into two according to the magnitude of the load current occurring onto the conductive wire, and the danger of a fire is lessened by reducing the circuit break time according to the magnitude of the load current.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. An apparatus for detecting an arc fault occurring on a conductive wire between a power source and a load, comprising:
    a voltage detector disposed between a phase conductive wire and a neutral wire, for detecting the amount of change in voltage per unit time with respect to the power source;
    a first frequency band setting unit for setting a frequency band for a low load current with respect to the signal output from the voltage detector;
    a first filter for detecting a high frequency signal out of the signal output from the first frequency band setting unit;
    a first level limiter for limiting a level of a dimmer signal out of the signal output from the first filter so as to discriminate between the dimmer signal and an arc signal;
    a second filter for detecting a high frequency signal out of the level-limited signal output from the first level limiter to detect only a frequency band of the arc signal;
    a first frequency limit amplifier for limitedly amplifying the frequency band of the signal detected from the second filter;
    a first level comparative oscillator for generating an oscillating signal with a pulse width determined according to the magnitude of current preset in a low load detecting route when the signal output from the first frequency limit amplifier is higher than a predetermined reference voltage;
    a first comparator for accumulating signals oscillated from the first level comparative oscillator and a second level comparative oscillator and generating a signal when the accumulated signal is higher than a reference voltage; a circuit breaker for breaking an electric connection between the power source and the load in response to the signal output from the first comparator;
    a second frequency band setting unit for setting a frequency band for a high load current with respect to the signal output from the voltage detector;
    a third filter for detecting a high frequency signal out of the signal output from the second frequency band setting unit;
    a second frequency limit amplifier for limitedly amplifying a frequency band of the signal detected from the third filter;
    the second level comparative oscillator for generating an oscillating signal with a pulse width determined according to the magnitude of current preset in a high load detecting route when the signal output from the second frequency limit amplifier is higher than a predetermined reference voltage;
    a current detector for detecting the amount of change in current flowing onto the phase conductive wire or the neutral wire and generating a signal proportional to the amount of change;
    a second comparator for setting the signal detected from the current detector as its reference voltage, receiving a setting reference voltage of one branch point of a load current detecting route as its input, and stopping generating an output signal when the signal output from the current detector is higher than the setting reference voltage of the branch point of the current detecting route; and
    a first current branch switching unit for limiting an output oscillation by controlling the second level comparative oscillator when the second comparator generates the output signal, and limiting an output oscillation by controlling the first level comparator oscillator when the second comparator does not generate the output signal.

2. The apparatus of claim 1, wherein the voltage detector detects a voltage between the phase conductive wire and the neutral wire by a bridge diode which is a rectifier.

3. An apparatus for detecting an arc fault occurring on a conductive wire between a power source and a load, comprising:
    a voltage detector disposed between a phase conductive wire and a neutral wire, for detecting the amount of change in voltage per unit time with respect to the power source;
    a first frequency band setting unit for setting a frequency band for a low load current with respect to the signal output from the voltage detector;
    a first filter for detecting a high frequency signal out of the signal output from the first frequency band setting unit;
    a first level limiter for limiting a level of a dimmer signal out of the signal output from the first filter so as to discriminate between the dimmer signal and an arc signal;
    a second filter for detecting a high frequency signal out of the level-limited signal output from the first level limiter to detect only a frequency band of the arc signal;
    a first frequency limit amplifier for limitedly amplifying the frequency band of the signal detected from the second filter;
    a first level comparative oscillator for generating an oscillating signal with a pulse width determined according to the magnitude of current preset in a low load detecting route when the signal output from the first frequency limit amplifier is higher than a predetermined reference voltage;
    a first comparator for accumulating signals oscillated from the first level comparative oscillator and a second level comparative oscillator and generating a signal when the accumulated signal is higher than a reference voltage;
    a circuit breaker for breaking an electric connection between the power source and the load in response to the signal output from the first comparator;
    a second frequency band setting unit for setting a frequency band for a high load current with respect to the signal output from the voltage detector;
    a third filter for detecting a high frequency signal out of the signal output from the second frequency band setting unit;
    a second frequency limit amplifier for limitedly amplifying a frequency band of the signal detected from the third filter;
    the second level comparative oscillator for generating an oscillating signal with a pulse width determined according to the magnitude of current preset in a high load detecting route when the signal output from the second frequency limit amplifier is higher than a predetermined reference voltage;

a current detector for detecting the amount of change in current flowing onto the phase conductive wire or the neutral wire and generating a signal proportional to the amount of change;

a second comparator for setting the signal detected from the current detector as its reference voltage, receiving a setting reference voltage of one branch point of a load current detecting route as its input, and stopping generating an output signal when the signal output from the current detector is higher than the setting reference voltage of the branch point of the current detecting route; and a first current branch switching unit for limiting an output oscillation by controlling the second level comparative oscillator when the second comparator generates the output signal, and limiting an output oscillation by controlling the first level comparator oscillator when the second comparator does not generate the output signal.

* * * * *